US005375027A

United States Patent [19]

Bledsoe et al.

[11] Patent Number: 5,375,027

[45] Date of Patent: Dec. 20, 1994

[54] FAIL SAFE CARTRIDGE FIRE UNIT

[75] Inventors: Jeffrey P. Bledsoe, Weatherford; William M. Carra, Fort Worth, both of Tex.

[73] Assignee: General Dynamics Corporation, Fort Worth, Tex.

[21] Appl. No.: 953,658

[22] Filed: Sep. 29, 1992

[51] Int. Cl.[5] ........................ H02H 3/26; H01H 47/02

[52] U.S. Cl. ........................ 361/87; 361/190; 307/99; 307/132 EA

[58] Field of Search ........................ 361/18, 31, 42, 57, 361/59, 87, 160, 170–172, 189–191; 307/99, 113, 115, 141.8, 131.1, 32 E, 132 EA; 340/644, 652, 664, 686, 687, 825.16, 825.18

[56] References Cited

U.S. PATENT DOCUMENTS

| | | | |
|---|---|---|---|
| 3,445,172 | 5/1969 | Zielinski | 431/24 |
| 3,626,248 | 12/1971 | Bartlett et al. | 317/9 D |
| 3,696,364 | 10/1972 | Lavelle | 340/252 R |
| 4,599,675 | 7/1986 | Fisher et al. | 361/173 |
| 4,845,475 | 7/1989 | Cooledge et al. | 340/644 |
| 4,977,478 | 12/1990 | Powell | 361/160 |
| 5,261,694 | 11/1993 | White et al. | 307/10.1 |

*Primary Examiner*—Jeffrey A. Gaffin

*Assistant Examiner*—Ronald W. Leja

*Attorney, Agent, or Firm*—Andrew J. Dillon; Duke W. Yee

[57] ABSTRACT

A fail-safe circuit for preventing an inadvertent communication of a signal from an input terminal to an output terminal includes a series switching network electrically connected between the input terminal and the output terminal. The series switching network contains two switching circuits electrically connected in series. One switching circuit is an electrical switching circuit and the other is an electromechanical switching circuit. The switching circuits are chosen such that defects causing the electrical switching circuit to short circuit do not affect the electromechanical switching circuit and defects causing the electromechanical switching circuit to short circuit do not affect the electrical switching circuit. The fail-safe circuit also includes circuitry for preventing inadvertent communication of the signal from the input terminal through the series switching network to the output terminal when one of the switching circuits is in a short circuited state or condition. This circuitry includes a circuit system for detecting a short circuit condition in the series switching network. Also included is another circuit system that is responsive to a short circuit condition within the series switching network for preventing the closing of the switching network to prevent communication of the signal from the input terminal through the series switching network to the output terminal.

18 Claims, 4 Drawing Sheets

FAIL SAFE CARTRIDGE FIRE UNIT

BACKGROUND OF THE INVENTION

1. Technical Field

The present invention relates generally to a system for sending a signal to a device and in particular, to a system for safely sending an electrical signal to a device. Still more particularly, the present invention provides an improved system for safely sending an electrical signal to a device by preventing the inadvertent sending of the electrical signal to the device.

2. Description of the Related Art

It is desirable to prevent the inadvertent jettison of weapons from military aircraft. Presently, circuits for preventing the inadvertent jettison of weapons employ additional electromechanical or solid state relays and test cables in the pylons; and, modification of the existing flight line testers is also required. The relays are added to the pylon to fulfill a single point failure requirement and the test cables and tester changes are required to detect the single point failure. The disadvantage of this system is the necessity for additional wiring, additional installed relays, and changes to standard test equipment.

One alternative method for preventing the inadvertent switching of power is illustrated in Fisher et al., U.S. Pat. No. 4,599,675. A switching system is utilized which comprises two transistors in series with a solenoid coil. A monitoring system is utilized to monitor the state of the two switches such that no single electrical fault can result in an inadvertent energization of a control valve. Specifically, in the event that one of the switches is off while the other is conducting, the monitoring system inhibits switching on the switch that is in the "off" state. Although such a system is useful in the event that one of the transistors fails, situations exist, such as current spikes, wherein the event that causes one transistor to fail will also Cause the other transistor to fail. In such a situation, the circuit has failed in a "on" state. Additionally, such systems typically pass current through the load (generally a solenoid coil) in order to test the state of the transistors. Allowing current to pass through a weapon or other pyrotechnic device is not a desirable situation.

Therefore, it would be desirable to have an improved switching system to prevent the inadvertent switching of power or a signal to a device and to reduce the potential for accidental release of weapons or firing of pyrotechnic devices,

SUMMARY OF THE INVENTION

It is therefore one object of the present invention to provide a system for sending a signal to a device.

It is another object of the present invention to provide a system for safely sending an electrical signal to a device.

It is yet another object of the present invention to provide an improved system for sending an electrical signal to a device though preventing the inadvertent sending of the electrical signal to the device.

The foregoing objects are achieved as is now described. A fail-safe circuit for preventing an inadvertent communication of a signal from an input terminal to an output terminal includes a series switching network electrically connected between the input terminal and the output terminal. An inadvertent signal is a signal that is not intended to be present. A signal may be, for example, a voltage or a current. The series switching network contains two switching circuits electrically connected in series. One switching circuit is an electrical switching circuit and the other is an electromechanical switching circuit. The switching circuits are chosen such that defects causing the electrical switching circuit to short circuit do not affect the electromechanical switching circuit and defects causing the electromechanical switching circuit to short circuit do not affect the electrical switching circuit. The fail-safe circuit also includes circuitry for preventing inadvertent communication of the signal from the input terminal through the series switching network to the output terminal when one of the switching circuits is in a short circuited state or condition. This circuitry includes a circuit system for detecting a short circuit condition in the series switching network without producing unwanted voltages or currents at the output terminal. Also included is another circuit system that is responsive to a short circuit condition in the series switching network exists, preventing the closing of the switching network to prevent communication of the signal from the input terminal through the series switching network to the output terminal.

A short circuit condition is present when a current level in the series switching network is outside of a predetermined range that is chosen for an absence of a short circuit condition. The fail-safe circuit also includes a circuit system for detecting the current level in the series switching network. The fail-safe circuit also includes one or more inputs for receiving a transmission signal signifying that the transmission of the signal from the input terminal to the output terminal should follow.

A circuit system is included for causing the series switching network to allow communication of the signal from the input terminal to the output terminal when the transmission signal is received at the inputs for receiving a transmission signal if a short circuit condition is absent in the series switching network.

Other circuitry is also included to transmit a drive signal to the electromechanical switching circuit and to the electrical switching circuit to allow the signal to travel through the electromechanical switching circuit and through the electrical switching circuit in response to receiving the transmission signal.

The above as well as additional objects, features, enhanced safety, and advantages of the present invention will become apparent in the following detailed written description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
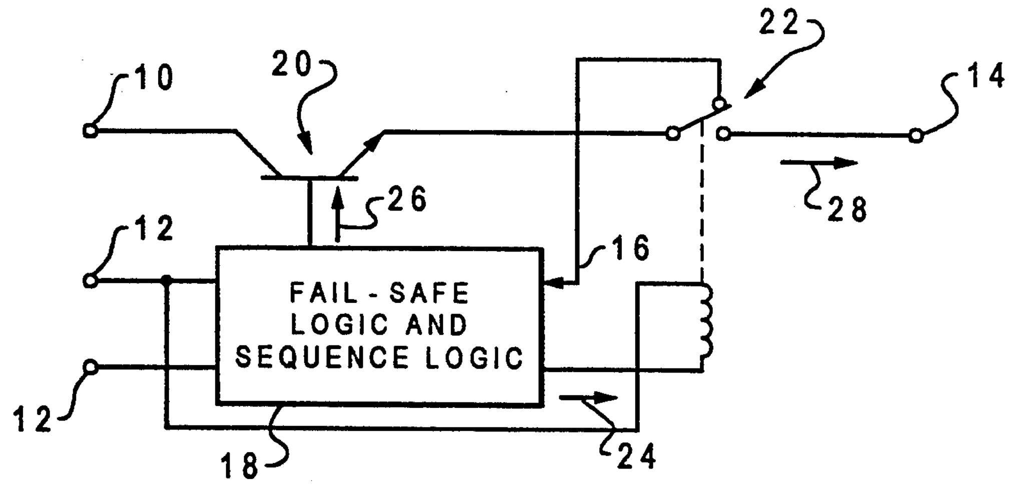
FIG. 1 depicts a schematic diagram of a fail-safe circuit in accordance with a preferred embodiment of the present invention.

With reference now to the figures and in particular with reference to FIG. 1, there is depicted a schematic diagram of a fail-safe circuit in accordance with a preferred embodiment of the present invention. Fail-safe circuit 1 has two sets of external inputs, input terminal 10 and control inputs 12. In the depicted embodiment control inputs 12 are utilized to receive a control signal. The output of the circuit is output terminal 14. Within the fail-safe circuit, sense input 16 is connected to logic device 18 and provides a current level input to logic device 18, indicating the state of electrical switch 20 and electromechanical switch 22. Electrical switch 20 is a bipolar junction transistor ("BJT") in this particular embodiment.

Various configurations of BJTs may be utilized in accordance with the present invention. For example, the BJT may be in an emitter follower configuration or in a Darlington transistor configuration. Additionally, electrical switches other than BJT's may be utilized, such as, for example, a metal-oxide-semiconductor field effect transistor ("MOSFET") or a complementary MOSFET ("CMOS"). Other types of electrical switches will be apparent to those of ordinary skill in the art and may be utilized as electrical switch 20 in accordance with a preferred embodiment of the present invention. Additional input configurations are also possible for different levels of required failure protection. For example, inputs 10 and 12 may be combined and output terminal 14 may be routed to system ground, rather than passing through an isolating control element with input 12.

Logic device 18 also provides electro-mechanical switch drive 24 and electrical switch drive 26 to close the switches and allow a signal to travel from input terminal 10 to output terminal 14 in response to the proper control signal being applied to control inputs 12.

Still referring to FIG. 1, when a signal is sent into input terminal 10 of fail-safe circuit 1, a current flows through electrical switch 20 and electromechanical switch 22 even though the switches are in an "off" position. Generally, if the magnitude of the current is very low (for example, less than some selected threshold on the order of one milliampere ("mA")), failure of the electromechanical switch is indicated. If the current level is high (for example, greater than a selected threshold on the order of 10 mA), the electrical switch is presumed to have failed in a short circuit state. Of course, leakage currents may be detected as either currents or voltages, as required by external loads and the control circuit utilized.

A control signal may be applied to control input 12 and logic device 18 delays for a suitable period of time to ensure that the control signal applied to control input 12 is stable. After that period of time, logic device 18 samples sense input 16 to determine the state of electrical switch 20 and electromechanical switch 22. If the current at sense input 16 is not within the selected range of normal currents (i.e., 1 mA–10 mA), logic device 18 will not provide electromechanical drive 24 and electrical switch drive 26 to the switches. This monitoring of the current is a fail-safe feature of the circuit in accordance with a preferred embodiment of the present invention. If the current at sense input 16 is normal, the switching sequence will then begin.

At the beginning of the switching sequence, logic device 18 activates electromechanical switch 11 with electromechanical switch drive 24. After a period of time suitable to allow for contact settling, logic device 18 provides electrical switch drive 26 to electrical switch 20, providing output signal 28. Output signal 28 in this preferred embodiment of the present invention is a current that is utilized to ignite a weapons cartridge attached to a pylon holding explosive devices. In other alternative embodiments, output signal 28 may be a signal other than a current for igniting a weapons cartridge. For example output signal 28 may be a digital signal sending data to a device connected to output terminal 14.

Electrical switch 20 may be maintained in the "on" state for a period of time suitable for ensuring ignition of the cartridge by output signal 28. After electrical switch 20 is turned off by logic device 18, logic device 18 may delay a short period of time before turning off electromechanical switch 22 with electromechanical drive 24 to protect electromechanical switch 22 from arcing and to limit the time duration of a high current load. This delay allows the use of an electromechanical switch which has a lower continuous current rating.

Figure 2:
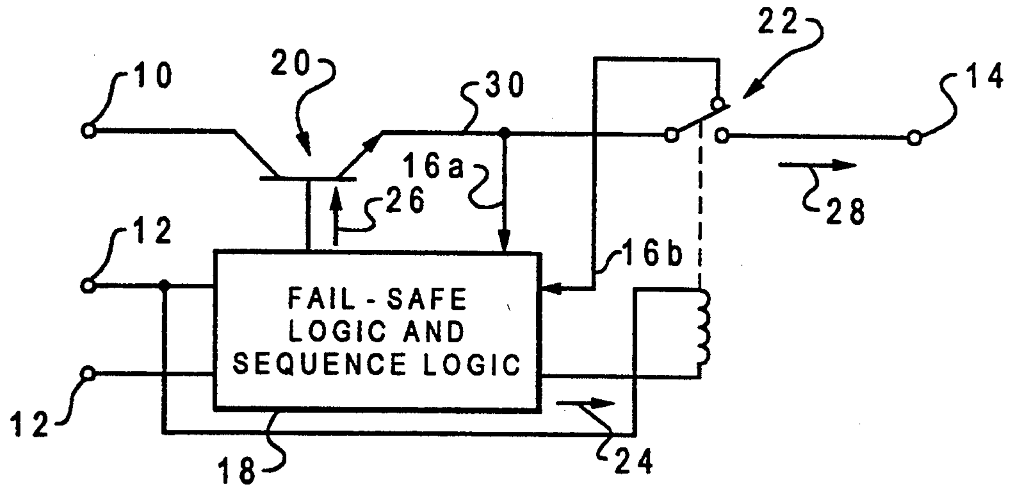
FIG. 2 is a schematic diagram of a fail-safe circuit in accordance with a preferred embodiment of the present invention.

Referring now to FIG. 2, there is depicted a schematic diagram of a fail-safe circuit in accordance with a preferred embodiment of the present invention. In this particular embodiment, logic device 18 includes sense input 16*a* connected to electrical switch output 30 and sense input 16*b* connected to electromechanical switch 22. This particular embodiment of the present invention is similar to the embodiment depicted in FIG. 1; an additional sense input is added to this particular embodiment which may allow for increased reliability in determining the initial condition of both electromechanical switch 22 and the electrical switch 20. Again as in described in FIG. 1, if either switch has malfunctioned, logic device 18 will not send electromechanical drive 24 to electromechanical switch 22 and will not send electrical switch drive 26 to electrical switch 20.

Figure 3:
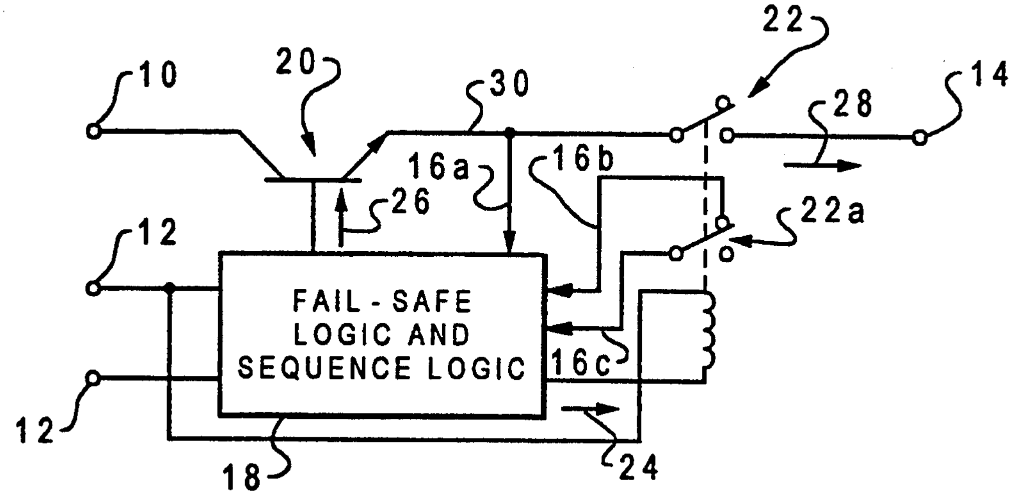
FIG. 3 depicts a schematic diagram of a fail-safe circuit providing more isolation between tests in accordance with a preferred embodiment of the present invention.

With reference now to FIG. 3, there is depicted a schematic of a fail-safe circuit providing more isolation between tests in accordance with a preferred embodiment of the present invention. Logic device 18 has sense input 16*a* connected to electrical switch output 30 and two sense inputs 16*b* and 16*c* connected to electromechanical switch 22. This alternate embodiment of the present invention may provide more isolation between tests of initial conditions of electrical switch 20, electromechanical switch 22 and electromechanical switch 22*a*. Additionally, it is contemplated that among other tests for determining positions of a electromechanical switch known to those of ordinary skill in the art, logic device 18 may use a continuity test to determine the position of electromechanical switch 22 and electromechanical switch 22*a* in accordance with a preferred embodiment of the present invention.

Note that a common feature of the embodiments in FIGS. 1, 2, and 3, is that the output terminal 30 is not involved in the fail-safe test, and that no voltages or currents other than the leakage of an open switch are normally present, and that even in the event of a failure of one switching element, unwanted voltages and currents are limited to the leakage voltages and currents of the unfailed switch which may be made arbitrarily small by judicious selection of switching elements.

Figure 4:
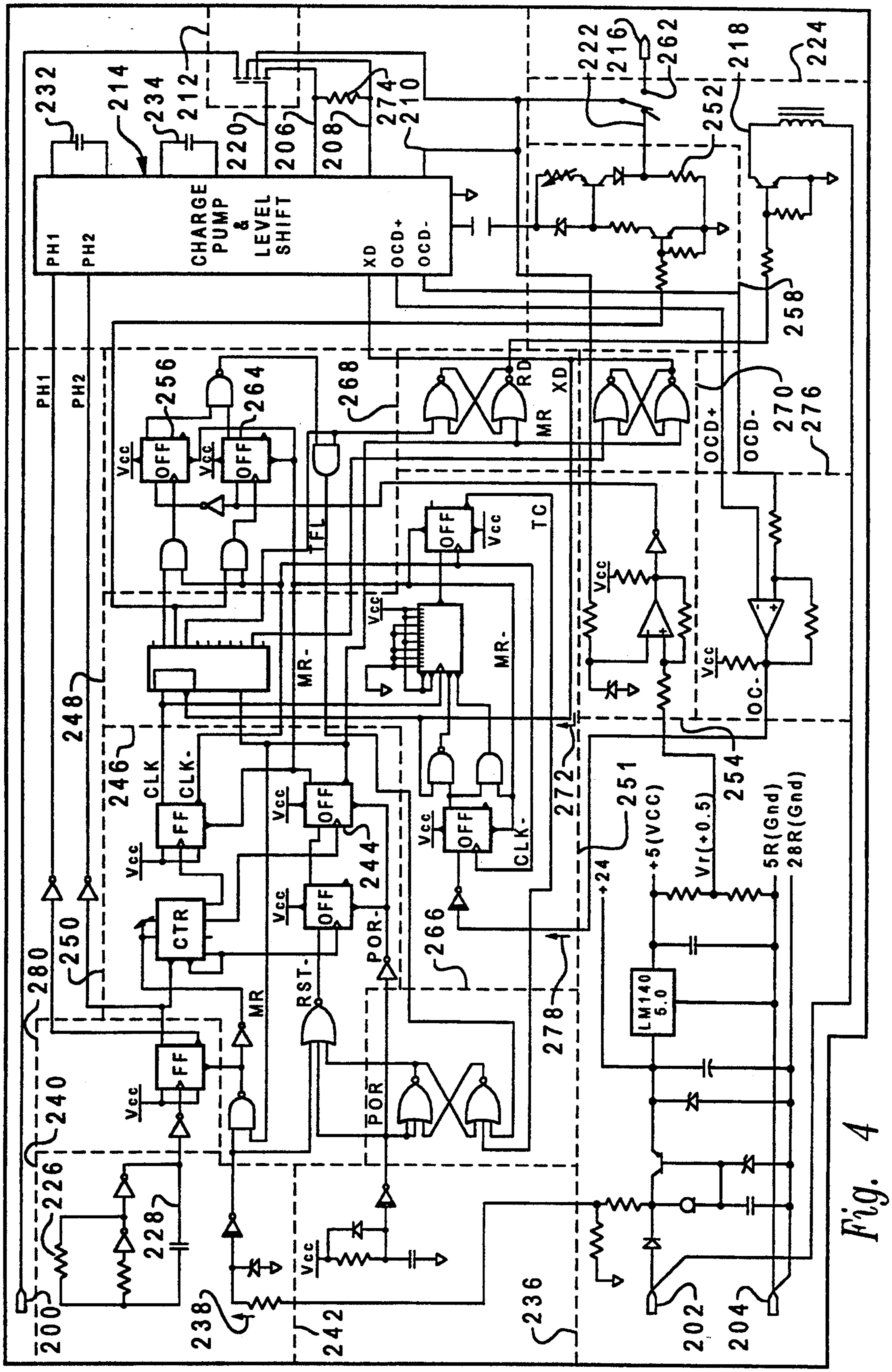
FIG. 4 is a detailed schematic diagram of a fail-safe circuit in accordance with a preferred embodiment of the present invention.

Referring now to FIG. 4, there is depicted a detailed schematic diagram of a fail-safe circuit in accordance with a preferred embodiment of the present invention. This particular embodiment of the present invention is for use in aircraft in connection with switching power to incendiary devices.

Other implementations of the present invention are contemplated and will be apparent to those of ordinary skill in the art, such as, as for example, incorporating a fail-safe circuit in accordance with a preferred embodiment of the present invention in manufacturing processes involving switching systems for use with solenoid operated control vanes for dangerous machinery. This fail-safe circuit may be implemented in any semiconductor technology. For implementations utilized in switching power to incendiary devices, low power consumption and dissipation, and high operating voltages are preferred, in accordance with a preferred embodiment of the present invention.

The fail-safe circuit in accordance with a preferred embodiment of the present invention includes three external inputs and three internal inputs. The three external inputs are MA 200, V28 202, and R28 204. MA 200 is the primary power input for weapons release. Next, V28 202 is the input for discrete/power supply. The signal to this input provides operating power from a nominal 28 volt aircraft power source and also indicates the start of the operating sequence. Then, R28 204 is the power supply return/input common connection.

Next, the three internal inputs are Mrr 206. Klv 208, and Sns 210. First. Mrr 206 is the connection to the mirror pin of SenseFet 212 and receives a scaled indication of Operating current level. SenseFet 212 is a current-sensing MOSFET and is the electrical switch in this fail-safe circuit in accordance with a preferred embodiment of the present invention. Next. Klv 208 is the connection to the kelvin (source) pin of SenseFet 212 and provides the reference for the mirror signal on the mirror pin of SenseFet 212, which is connected to Mrr 206. Then, Sns 210 is connected to an internal voltage comparator in charge pump and level shift circuit 214. The signal directed into an internal voltage comparator via Sns 210 is utilized to monitor SenseFet leakage current (Idss) during the first part of the test cycle. The signal directed into Sns 210 also provides an output reference level to charge pump and level shift circuit 214.

Turning now to the outputs of the fail-safe circuit in accordance with a preferred embodiment of the present invention, the fail-safe circuit has one external and three internal outputs: Out 216, Rly-218, Gtt 220, and Tst 222. The "-" in "Rly-218" indicates a NOT or an inverted signal at an output. Thus. "Rly-" is equal to "NOT Rly", meaning the signal at Rly- is inverted. The external output, Out 216, is a controlled, fail-safe output to the explosive cartridge load in the pylon and is electrically connected to the fail-safe circuit.

Next, Rly-218 is an active-low output to an electromechanical switch 224. This is a relay driver output, with internal voltage clamp diode, and should be implemented as an open-collector/open-drain in accordance with a preferred embodiment of the present invention. Gtt 220 provides the SenseFet 212 gate drive output and is configured for high-side drive. Gtt 220 should have internal voltage clamping, referenced to Sns 210, to prevent overdrive of SenseFet 212 in accordance with a preferred embodiment of the present invention. Tst 222 is implemented as an internal current source driving an internal or external resistor. During the second part of the test cycle, a signal from Tst 222 provides a voltage (current) to monitor the position of electromechanical switch 224.

Additional signals are also utilized in accordance with a preferred embodiment of the present invention to describe the function of fail-safe circuit. The various types of signals that may be utilized may vary depending on the particular implementation of the present invention. These signals include: Rt 226 and Ct 228, which are connections for oscillator timing components and Ca 232 and Cb 234, which are signals associated with charge pump capacitors Ca 232*a* and Cb 234*a* connected to charge pump and level shift circuit 214. The capacitors are utilized for the generation of the enhanced gate drive voltage.

Turning now to the sequence of events involving the fail-safe circuit in accordance with a preferred embodiment of the present invention, during periods of non-operation, inputs V28 202 and R28 204 are open-circuited, and all other inputs and outputs are isolated by external circuitry. The only currents seen by the fail-safe circuit in accordance with the preferred embodiment of the present invention are leakage currents.

The pre-operation begins when aircraft power is applied to external circuitry, i.e., input 200. At this time, the fail-safe circuit is still unpowered, but may see additional leakage currents through the SenseFet 212, (Igss, Idss). The fail-safe circuit is intended to float to the voltage level necessary to reduce these leakage currents to nearly zero. In the absence of multiple failures these leakage currents should be less than $10^{-9}$ amperes.

The operation begins with the application of aircraft power and ground to V28 202 and R28 204, respectively. Leakage currents present are returned to ground at this time, and the fail-safe circuit begins the power-up sequence. During this phase, internal power supply 236 follows the signal, V28 202, until regulation is achieved and derives an internal signal Vjr 238. Signal Vjr 238 will track any rise and fall of V28 238 caused by external contact bounce, etc., but the regulated internal power will be decoupled.

Next, as internal power supply 136 rises and comes into regulation, timing oscillator 240 starts and stabilizes. Clock pulses, however, are not supplied to the internal circuitry until power-on reset is complete in accordance with a preferred embodiment of the present invention.

Power-on reset ("POR") circuit 242 tracks the rising internal power supply and holds reset active until the power has been stable for approximately 100 microseconds in accordance with a preferred embodiment of the present invention. Other amounts of time of stability may be utilized to hold reset active depending on the components utilized. During this time, Master reset flip-flop 244, located in debounce circuit 246, is held in reset, holding all other counters and flip-flops in reset. When POR circuit 242 releases, the Master reset flip-flop 244 is released and awaits a valid start signal.

The combination of signal Vjr 238 being asserted and POR circuit 242 being negated is presented to debounce circuit 246, a digital filter, to validate the state of signal Vjr 238 in accordance with a preferred embodiment of the present invention. If signal Vjr 238 is asserted for 16 clock pulses, master reset flip-flop 242 is toggled, and sequencer 248 begins operation 16 clock pulses later in accordance with a preferred embodiment of the present invention. Any bouncing of the Vjr signal, signal Vjr 238, resets the state of the debounce circuit 246, thus spurious signals may be rejected.

Next, the charge pump drive 214 is derived from the timing oscillator 240 and is enabled with the acceptance of signal Vjr 238 as a valid signal. If a separate charge pump oscillator is used in an alternative embodiment in accordance with the present invention, it may be enabled later in the sequence.

Then, the debounce/master reset circuit 250 generates Clk and Clk- signals to drive sequencer 248 and time counter 251. In accordance with a preferred embodiment of the present invention, these signals are from the timing oscillator and divided by 64, for a nominal frequency of 1 kHz. Others combinations that meet various timing specifications that might be utilized are acceptable.

The first Clk pulse transitions sequencer 248 from state 0 (reset) to state 1 (test Idss). The SenseFet 212 Idss signal, converted to a voltage by resistor 252, is compared to a threshold of 0.5 volts (corresponding to 1 mA) by Sns input comparator 254. During the high portion of Clk-, the state of this signal is stored in Test1 flip-flop 256.

After the first Clk pulse, the second Clk pulse transitions the sequencer to state 2 (test electromechanical switch 224 position). Current source 258 is enabled, forcing current into a test resistor and placing about 1 V on normally closed electromechanical switch contact 262. If electromechanical switch 224 is in the proper position, this voltage appears at the Sns input 210, is compared to 0.5 volt, and the inverted state is stored in Test2 flip-flop 264 during the high portion of Clk-.

The Sns 210 should transition during this test sequence, and logic highs are stored in the flip-flops to indicate no failures. Following Clk pulse two, Clk pulse three moves sequencer to state 3 (store test result/close electromechanical switch). The states of Test1 flip-flop 256 and Test2 flip-flop 264 are sampled on the leading edge of the sequencer 248 state output, and if two logic "ones" are not present, Fail flip-flop 266 is set. The setting of Fail flip-flop 266 clears Master reset flip-flop 244 and halts operation. If two "ones" are present, the Relay flip-flop 268 is set, commanding the electromechanical switch 224 to close through Rly-218 output.

Six Clk pulses later (to allow relay settling time to guarantee dry switching of the relay), sequencer 248 is advanced to state 9 and the Xstr flip-flop 270 is set. This flip-flop enables the gate drive output, Gtt 220, of the charge pump and level shift circuit 214, turning on SenseFet 212 and providing the desired output. Additionally, this flip-flop provides enable signal 272 to the time counter 251, preparing it for counting down. This same signal also disables sequencer 248, locking the fail-safe circuit in state 9 and providing continuous output.

Under normal operating conditions, the fail-safe circuit remains in state 9, providing drive to the SenseFet 212. The result is the provision of output to aircraft loads for an indefinite period of time. Turnoff is accomplished by removing simultaneously removing both V28 202 and R28 204, which causes Master reset flip-flop 244 to be activated. As a result, Relay flip-flop 268 and Xstr flip-flop 270 are reset and the Gtt 220 and Rly-218 outputs are turned off. The internal power is also decaying at this time, further reducing the drive available from Gtt 220. Electromechanical switch 224 has a slow drop-out characteristic, thus providing time for the SenseFet 212 to turn off before the electromechanical switch 224 opens, ensuring dry switching.

The mirror current for SenseFet 212, flowing through the sense resistor 274 between mirror and kelvin terminals, will generate a voltage proportional to the load current at the fail-safe circuit terminals for Mrr 206 and Klv 208 terminals. An internal difference amplifier level in charge pump and level shift circuit 214 translates and amplifies this signal, and transfers it to comparator 276. The load signal provided by SenseFet 212 is riding a high common-mode voltage, i.e., SenseFet 212 source (output) voltage or approximately 28 volts. If the load on SenseFet 212 exceeds the rated load, the internal signal to comparator 276 will exceed the preset threshold, comparator 276 switches and NOT OverCurrent(OC-) 278 is asserted.

OC-278 signal is synchronized to Clk- and enables the time counter 251. As long as OC-278 remains asserted, the time counter 251 counts from a preset value towards zero. When the time counter 251 reaches zero, the terminal count signal, synchronized to Clk-, sets the Fail flip-flop 266 thereby initiating a master reset sequence. If OC-278 negates before time out, the time counter 250 is preset to the maximum time value, and no reset occurs.

Phase generator 280 is utilized to divide an input signal from timing oscillator 240 to create a two phase clock signal.

Sequencer 248 in the depicted embodiment contains 10 states, state 0–state 9. State 0 is the reset state and state 1 is the state in which the IDSS signal for SenseFet 212 is tested. State 2 is the state in which the relay contacts are tested. State 3 is the state in which the test result is stored and in which the electromechanical switch is closed. States 4–9 occupy about 6 milliseconds of time and allow the electromechanical switch 224 to settle before turning on SenseFet 212. Finally, in state 9 the electrical switch, SenseFet 212, is turned "on" and power is supplied through Out 216.

Figure 5:
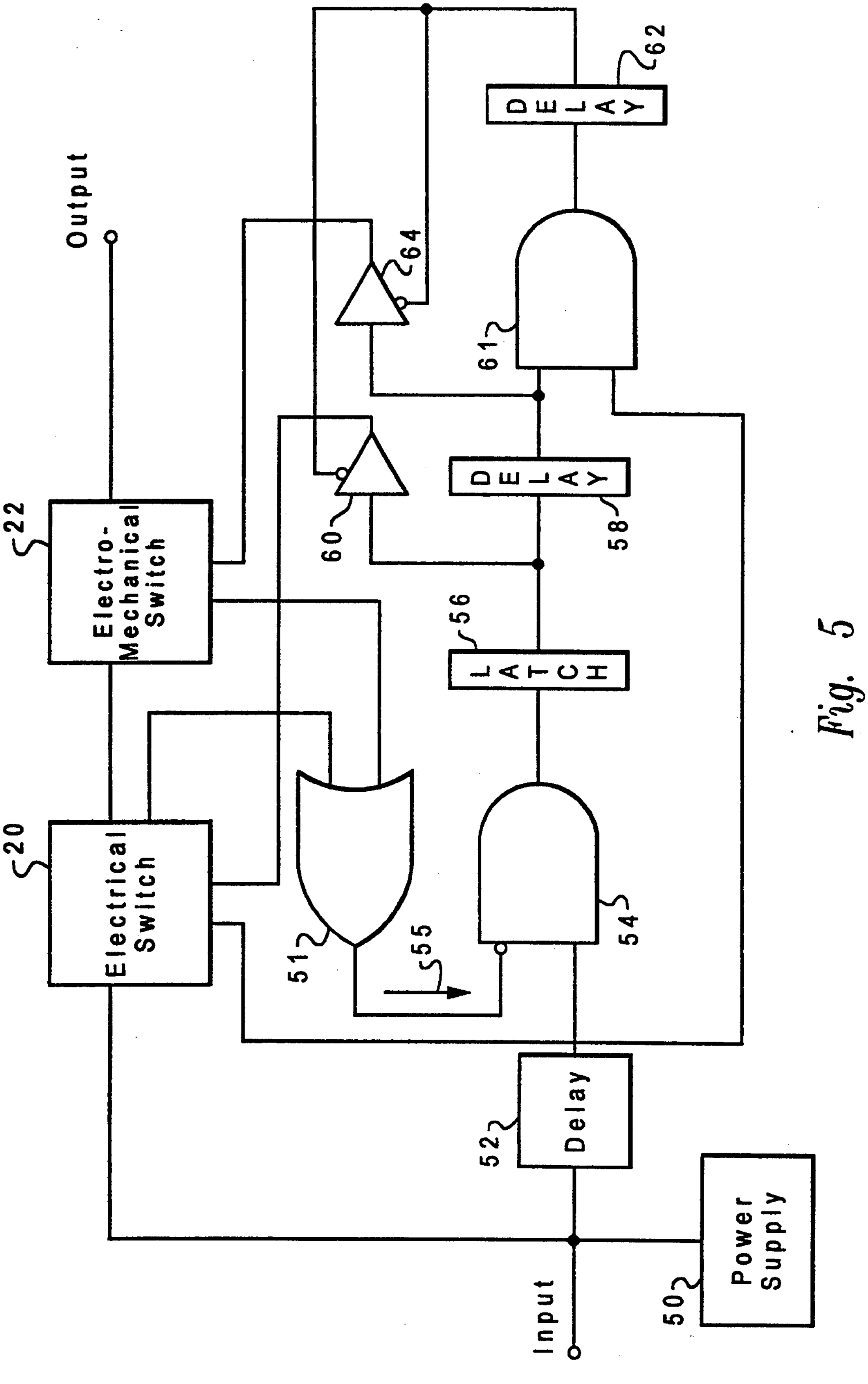
FIG. 5 depicts a logic diagram of a fail-safe circuit in accordance with a preferred embodiment of the present invention.

With reference now to FIG. 5, there is depicted a logic diagram of a fail-safe circuit in accordance with a preferred embodiment of the present invention. Power supply block 50 is connected to the delay block 52 and electrical switch 20. Delay block 52 is utilized for settling input from the jettison release control circuit ("J/R"). This input is sent into AND gate 54. Signal 55, originating from an output from NOR gate 51, results from a signal from electrical switch 20 and electromechanical switch 22 being sent into NOR gate 51. Signal 55 is inverted and then directed into AND gate 54. This signal, before being inverted and sent into AND gate 54, is a logic 1 if either switch is in a short circuit state. A short circuit in either switch results a logic 0 as the output from AND gate 54.

Next, the output from AND gate 54 is sent into latch 56, and part of the output from the latch 56 is sent into delay block 58. A portion of the output is fed into active low logic gate 60. The portion of the signal sent into delay block 58 travels is split with part of the signal travelling to AND gate 61 and the other part of the signal travelling to active low logic gate 64. An output from electric switch 20 is also sent into AND gate 61. The output from AND gate 61 is sent to delay block 62. The signal travelling through delay block 62 is sent to active low logic gates 60 and 64.

The output signal from active low logic gate 64 is electrical switch drive 26, and the output signal from active low logic gate 60 is electro-mechanical switch drive 24.

Figure 6:
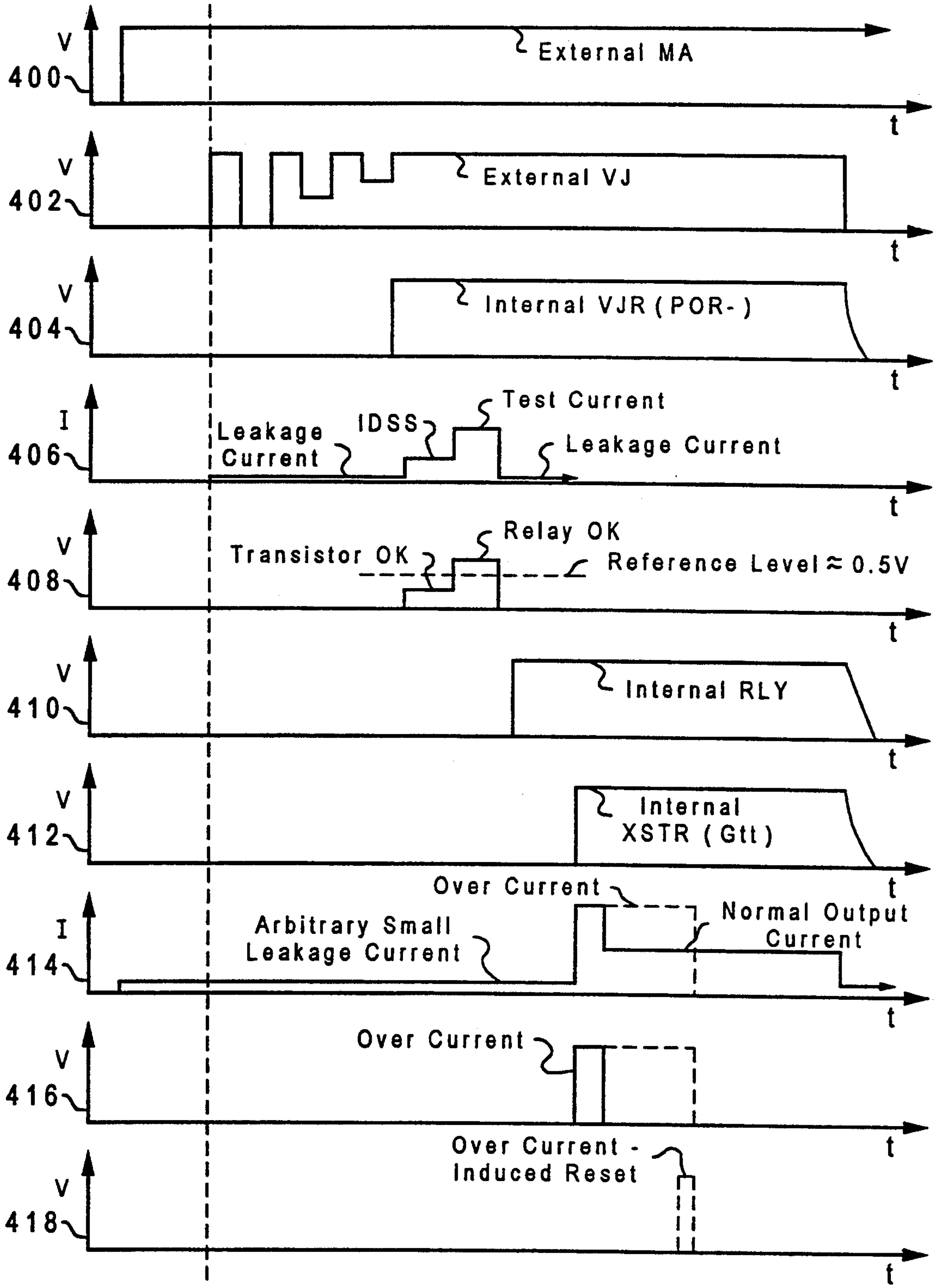
FIG. 6 depicts a timing diagram illustrating the sequence of events during the operation of the fail-safe circuit in accordance with a preferred embodiment of the present invention.

Referring now to FIG. 6, there is depicted a timing diagram illustrating the sequence of events during the operation of the fail-safe circuit in accordance with a preferred embodiment of the present invention. In accordance with a preferred embodiment of the present invention, a constant 28 volt power source is applied to input terminal 10 as illustrated by signal 400. Signal 402 is sent into control input 12. Relay bouncing in control input voltage occurs for a short period of time as indicated by signal 402. After a period of time has passed to allow bouncing to end, signal 402 is stable at about 28 volts in accordance with a preferred embodiment of the present invention.

Signal 404 indicates that stability of input 402 has been achieved, and initiates the test sequence. Leakage and test currents, indicated by signal 406, are monitored to determine the state of the switches. Converted to a voltage signal 408, the leakage and test currents are sequentially compared to a reference voltage, and the states are then stored.

If the signal sent into logic device 18 by sense input 16 indicates that electrical switch 20 and electromechanical switch 22 are working, electromechanical switch drive 24 is provided to electromechanical switch 22 as depicted by signal 410.

After a delay sufficient to allow the electromechanical relay to settle, electrical switch drive 26 is provided to electrical switch 20. Electrical switch drive 26 is illustrated by signal 412. Output terminal 14 then delivers output signal 28 as illustrated by signal 414 in the timing diagram of FIG. 6. Initially, very small leakage currents may be present; however, at a level insignificant compared to the thresholds of the loads typically attached.

Should there be a failure in the load which results in continued over-currents, as depicted by the dotted lines in signal 414, the over current detection circuitry will respond, as indicated by signal 416. If the over current continues for a period of time greater than an established limit, over current reset signal 418 is generated, thus deactivating the electrical and electromechanical switches, protecting both the circuit and the load.

While the invention has been particularly shown and described with reference to a preferred embodiment, it will be understood by those skilled in the art that various changes in form and detail may be made therein without departing from the spirit and scope of the invention.

What is claimed is:

1. A circuit for preventing an inadvertent communication of a signal from an input terminal to an output terminal, said circuit comprising:

a series switching network electrically connected between said input terminal and said output terminal, said series switching network comprising two switching circuits electrically connected in series, said two circuits comprising an electrical switching circuit and an electromechanical switching circuit, wherein defects causing said electrical switching circuit to short circuit do not affect said electromechanical switching circuit and defects causing said electromechanical switching circuit to short circuit do not affect said electrical switching circuit; and fail-safe means for preventing inadvertent communication of said signal from said input terminal through said series switching network to said output terminal, said fail-safe means comprising:

means for detecting a short circuit condition in said series switching network and means, responsive to said short circuit condition within said series switching network for preventing closing of said switching network to prevent communication of said signal from said input terminal through said series switching network to said output terminal.

2. The circuit of claim 1, wherein said means for detecting said short circuit condition in said series switching network is independent of said output terminal, wherein inadvertent signals in said output terminal are prevented.

3. The circuit of claim 1, wherein said short circuit condition is present when a current level in said series switching network is outside of a predetermined range and wherein said means for detecting said short circuit condition in said series switching network comprises means for detecting said current level in said series switching network.

4. The circuit of claim 3 further comprising means for receiving a transmission signal prior to transmission of said signal from said input terminal to said output terminal.

5. The circuit of claim 4 further comprising means, responsive to an absence of a short circuit condition in said series switching network, for permitting said series switching network to allow communication of said signal from said input terminal to said output terminal in response to reception of said transmission signal.

6. The circuit of claim 5, further including means for transmitting a drive signal to said electromechanical switching circuit to allow said signal to travel through said electromechanical switching circuit in response to receiving said transmission signal.

7. The circuit of claim 6, further including means for transmitting a second drive signal to said electrical switching circuit, wherein said signal is allowed to travel through said electrical switching circuit in response to receiving said transmission signal.

8. The circuit of claim 6, wherein said electrical switching circuit comprises a metal-oxide-semiconductor field effect transistor including a gate, a gate terminal, a drain terminal, and a source terminal.

9. A circuit for preventing an inadvertent communication of a signal from an input terminal to an output terminal, said circuit comprising:

a series switching network electrically connected between said input terminal and said output terminal, said series switching network comprising two switching circuits electrically connected in series, said two circuits comprising an electrical switching circuit and an electromechanical switching circuit, wherein defects causing said electrical switching circuit to short circuit do not affect said electromechanical switching circuit and defects causing said electromechanical switching circuit to short circuit do not affect said electrical switching circuit; and fail-safe means for preventing inadvertent communication of said signal from said input terminal through said series switching network to said output terminal, said fail-safe means comprising:

means for detecting a short circuit state in either said electrical switching circuit or said electromechanical switching circuit and means, responsive to a short circuit state in either said electrical switching circuit or in said electromechanical switching circuit, for preventing closure of the other switching circuit, wherein communication of said signal from said input terminal through said series switching network to said output terminal is prevented.

10. The circuit of claim 9, wherein said means for detecting said short circuit condition in said series switching network is independent of said output terminal, wherein inadvertent signals in said output terminal are prevented.

11. The circuit of claim 9, wherein said means for detecting a short circuit state in either said electrical switching circuit or said electromechanical switching circuit comprises means for detecting a current flowing through said electrical switching circuit and detecting a current flow through said electromechanical switching circuit.

12. The circuit of claim 11, wherein said means for detecting a short circuit state in either said electrical switching circuit or said electromechanical switching circuit comprises means for testing said electromechanical switching circuit to determine a switch position of a switch in said electromechanical circuit.

13. The circuit of claim 12 further comprising means for receiving a transmission signal indicating that transmission of said signal from said input terminal to said output terminal should occur.

14. The circuit of claim 13, further including means for transmitting a drive signal to said electromechanical switch to allow said signal to travel through said electromechanical switching circuit in response to receiving said transmission signal.

15. The circuit of claim 14, further including means for transmitting a second drive signal to said electrical switching circuit, wherein said signal is allowed to travel through said electrical switching circuit in response to receiving said transmission signal.

16. The circuit of claim 15, wherein said electrical switching circuit comprises a metal-oxide-semiconductor field effect transistor including a gate, a gate terminal, a drain terminal, and a source terminal.

17. The circuit of claim 12, wherein said electrical switching circuit comprises a bipolar junction transistor.

18. The circuit of claim 12, wherein said electrical switching circuit comprises a metal-oxide-semiconductor field effect transistor.

* * * * *